United States Patent Office 3,067,817
Patented Dec. 11, 1962

3,067,817
AUTOMATICALLY REGULATED RADIATOR TYPE
COOLING SYSTEM
John C. Aydelott and William W. Peters, Erie, Pa., assignors to General Electric Company, a corporation of New York
Filed Dec. 23, 1959, Ser. No. 861,537
16 Claims. (Cl. 257—308)

This invention relates to cooling systems and in particular to automatically regulated radiator type cooling systems.

A common use of automatically regulated radiator cooling systems is to control the temperature of railroad locomotive engines. A desirable radiator type cooling system for a locomotive must be able to maintain the temperature of the locomotive engine within a given range regardless of wide variations in the amount of heat generated by the engine, and wide variations in the heat dissipating ability of the radiator at a given time. The heat generated by the engine varies from a maximum under full load conditions to a minimum, which may be only one twentieth of the maximum, when the engine is idling. The ability of the radiator to dissipate heat also varies from a maximum at low altitude in extremely cold weather to a minimum at high altitudes when the ambient temperature is high. This heat dissipating ability of the radiator may vary as much as three times, or in a ratio of 3 to 1 from a maximum to a minimum dissipating condition. Therefore, it will be seen that the overall variations to which the system may be subjected are in the range of 60 to 1.

Several different arrangements have been employed in the past to obtain the desired regulation of a radiator type cooling system under widely varying load and ambient temperature conditions. For example, one common arrangement is to use shutters to reduce the circulation of air over a radiator surface when the radiator tends to reduce the temperature of the engine below a desirable level. In a second common type of arrangement the cooling capacity of a radiator type cooling system is varied by providing a plurality of radiator units in a parallel arrangement within the system, and providing valves for regulating the number of radiators connected into the system as the amount of heat generated by the engine varies.

While such common arrangements for varying the heat dissipating capacity of a radiator type cooling system have met with some success, this success has been somewhat limited by the fact that in the first of these arrangements the shutters are expensive and cumbersome to install and operate, as well as being susceptible to frequent minor mechanical failures which increase their maintenance cost. In the multiple-radiator type cooling systems currently in use, thermal-responsive valves are employed to control the connection of more radiators into the cooling system as the temperature of the engine rises. Such systems have the inherent disadvantage of a relatively slow reaction time; therefore, when the system is being operated in extremely cold ambient temperatures, coolant flowing through the radiators tends to freeze when the volume of the flow is reduced to a trickle during the interval of time when the valves are either opening or closing. Of course, when such freezing occurs, the radiator may be extensively damaged. To overcome this likelihood of damage to thermal-responsive radiator type cooling systems, several relatively complex and expensive automatic control systems have been developed in the prior art; however, in addition to their expense, these systems are themselves so complex that they tend to further increase maintenance costs.

A solution to all of the above-mentioned problems is provided by this invention which affords a cooling system that is flexible enough to be used under widely varying ambient temperature and load conditions and has means for automatically regulating the cooling capacity of the system in such a manner that coolant is prevented from freezing in the radiators of the system in even the coldest weather. The control means embodied in the invention are extremely simple and thus relatively maintenance-free, and since the control is entirely automatic, no cumbersome external control means are necessary. Also, the number of working parts in the control means has been reduced to a minimum and the arrangement of these parts has been improved to further reduce the chance of mechanical failure of the system.

Accordingly, it is a specific object of this invention to provide a radiator-type cooling system that embodies means for preventing coolant from freezing in the radiator portion of the system.

Another object of this invention is to provide a radiator-type cooling system with means directly subjected to the temperature and the pressure of coolant within the system for regulating the flow of coolant through the radiator portion of the system.

Still another object of this invention is to provide a radiator-type cooling system that is automatically adaptable to widely varying load and ambient climatic conditions.

A still further object of this invention is to provide an entirely automatic, simple, and relatively maintenance-free coolant flow control regulating means for a radiator-type cooling system.

An additional object of this invention is to provide a radiator-type cooling system with entirely automatic coolant flow control means that are wholly contained within the coolant confining means and that are not connected to any external control means.

Other objects and advantages of the invention will become apparent from the description that follows.

Briefly stated, in accordance with one embodiment of the invention, a radiator-type cooling system including a plurality of radiators connected in parallel and arranged to receive a fluid coolant from a heat-generating source, such as a locomotive engine, which is to be maintained within a given temperature range is provided. After passing in heat exchange relation with the engine, the coolant either drains directly into a storage tank from whence it is again circulated in heat exchange relation with the engine, or it flows into the radiators and then to the storage tank. A temperature-responsive valve controls the flow of coolant from the engine to the radiators and the storage tank, and the flow of coolant to each individual radiator is further controlled by a plurality of pressure-responsive valves disposed in the inlet ports of each of the radiators. The pressure-responsive valves are subservient to the temperature-responsive valve so these control valves do not tend to buck one another. Bypass passages are provided so that if any of these valves are closed, coolant is bypassed around the radiators back to the storage tank. The radiators are so arranged in relation to the coolant storage tank that coolant drains by gravity flow rapidly from the radiators when the pressure-responsive valves close.

While the invention is clearly defined in the claims which form a part of this specification, the invention may more readily be understood by reference to the following description taken in connection with the accompanying drawing in which:

Figure 1:
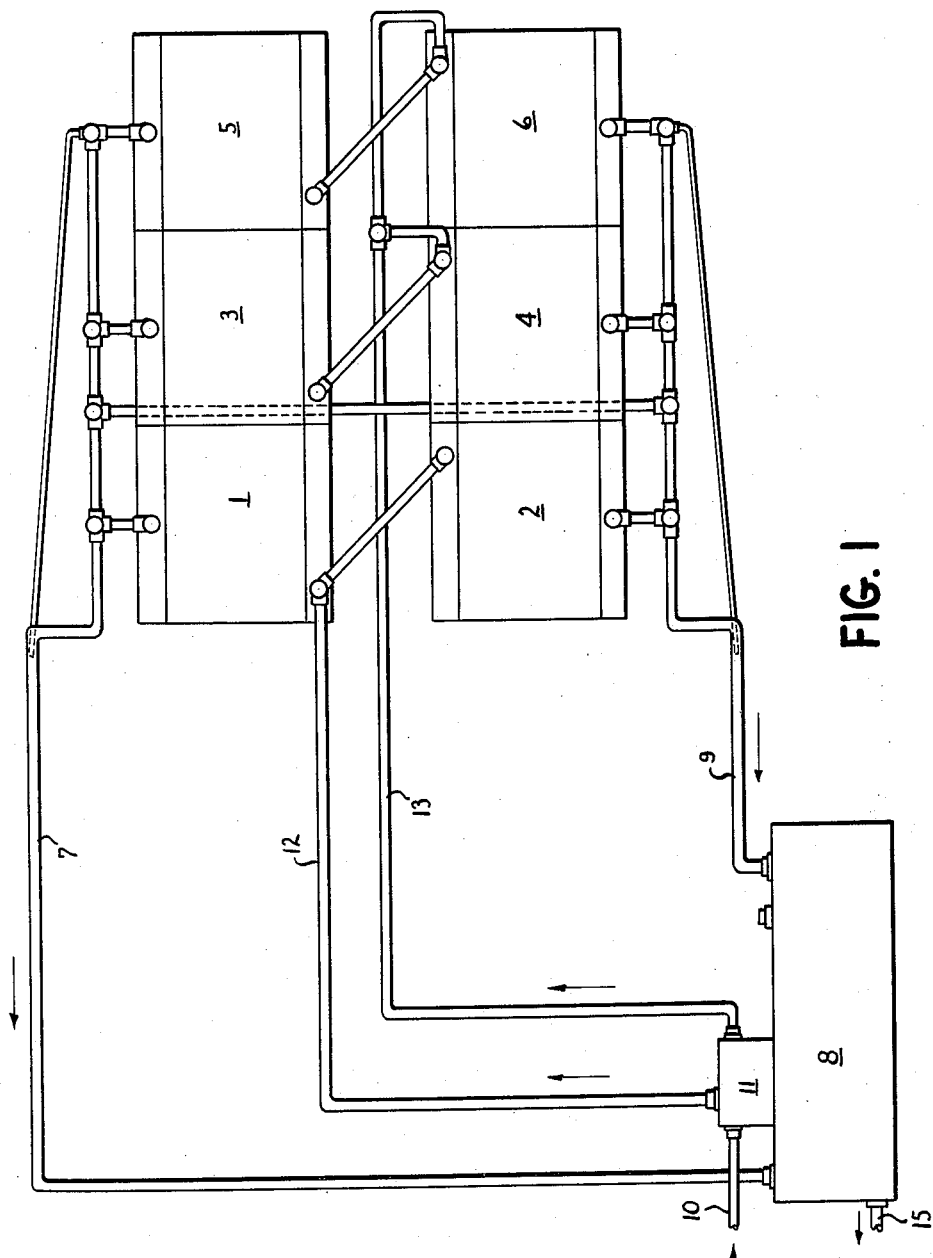
FIG. 1 is a schematic diagram of a coolant storage tank and a plurality of radiators connected together by conduit means in accordance with the invention.

With reference to the drawings, we have shown a multi-unit type of heat-dissipating radiator having a plurality of separate radiators 1, 2, 3, 4, 5, and 6. The outlet ports of each of the radiators 1, 3, and 5 are connected through conduit 7 to a coolant storage tank 8 and the outlet ports of each of the radiators 2, 4, and 6 are connected through a conduit 9 to the storage tank 8. Tank 8 is positioned below radiators 1 through 6 so coolant will drain rapidly from all of the radiators by gravity flow into tank 8. A conduit 10, which may be connected to any heat-generating source, such as a diesel engine of a locomotive (not shown), is connected through an automatic coolant flow control means, or unit, 11 and a conduit 12 to radiators 1 and 2. Conduit 10 is also connected through the control means 11 and conduit 13 to radiators 3, 4, 5 and 6.

Coolant is circulated through the system under pressure by circulating means such as a water pump (not shown). After the coolant has been reduced to a desirable temperature by being circulated through the radiators 1 through 6, it is returned to the storage tank 8 and then through the conduit 15 back to the heat-generating source where it once again becomes heated and is again circulated through the conduit 10 to repeat the cooling cycle.

The automatic flow control means 11 regulates the number of radiators that will be utilized at any given time to dissipate heat from the circulating coolant and thus serves to maintain the coolant and consequently the heat-generating source within a predetermined temperature range. For purposes of illustration, radiators 1 through 6 are shown as divided into two separately controlled groups. The first of these groups includes the radiators 1 and 2, which have their inlet ports connected to conduit 12, and the second of these groups includes the radiators 3, 4, 5, and 6, which have their inlet ports connected to conduit 13. Of course, more than two separate groups of radiators could be utilized, and in practice this will probably be done in cases where the heat-generating source with which the radiators are to be utilized is employed in widely varying climatic conditions.

Figure 2:
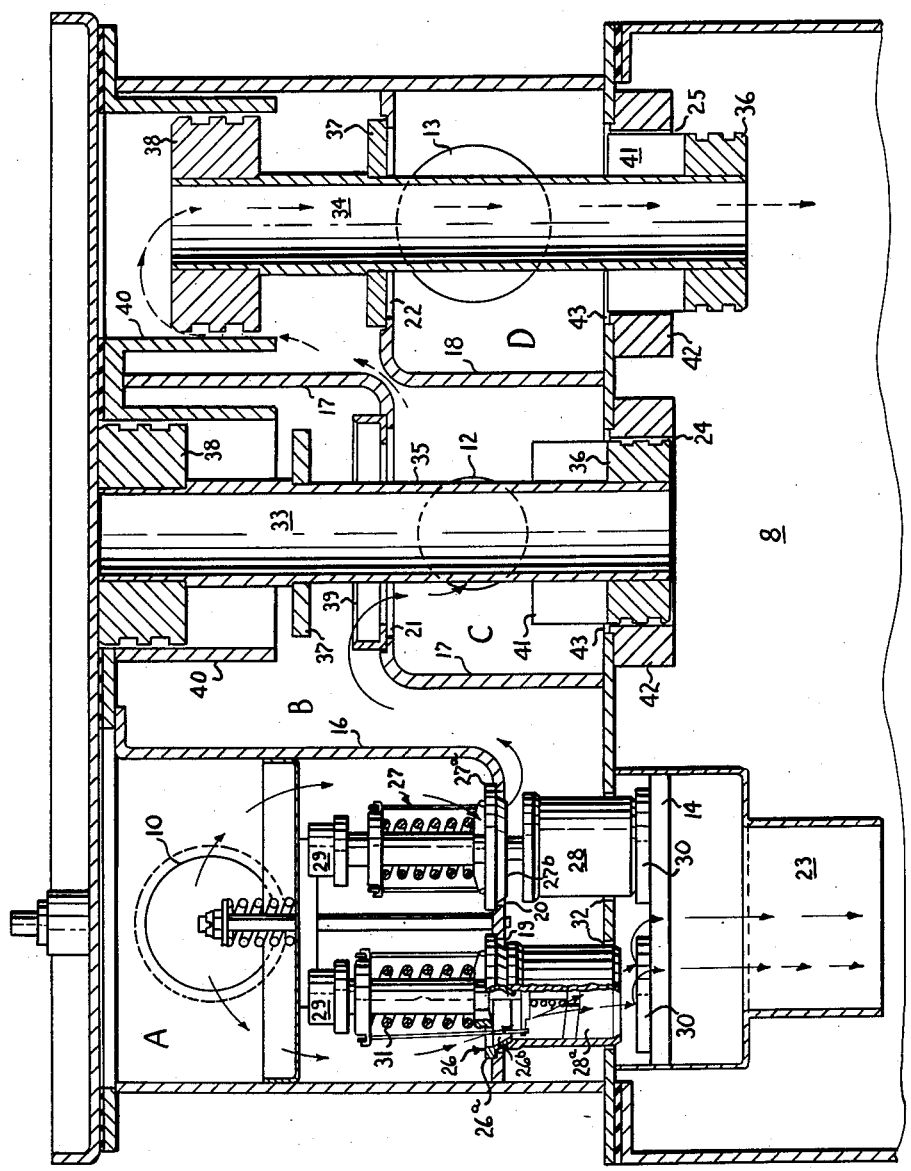
FIG. 2 is a side elevation, partly in section, of the control valve structure for an automatically regulated radiator-type cooling system.

FIG. 2 shows a side elevation, partly in section, of the automatic flow controlling means, or unit, 11 that forms an important part of the invention. As will be seen by referring to FIG. 2, the outer walls of unit 11 define a longitudinal passageway between coolant inlet conduit 10 and conduits 12 and 13, which communicate respectively with radiator groups 1, 2 and 3, 4, 5, 6. In order to provide means for controlling the flow of coolant from this passageway to given radiators, the passageway is divided by walls 16, 17, and 18 into four separate chambers A, B, C, and D which are disposed in series along the passageway. Ports 19 and 20, 21 and 22 provide communication between adjacent chambers so the flow of coolant may be passed from inlet chamber A and intermediate chamber B to the outlet chambers C and D. Communication between chambers B, C and D and the storage tank 8 is provided by duct 23 and ports 24 and 25 respectively.

In order to control the flow of coolant from inlet chamber A to the intermediate chamber B, two temperature-responsive valves 26 and 27 are provided having annular seat members 26a and 27a mounted in ports 19 and 20 respectively in the wall 16 between chambers A and B. In addition to the seat members 26a and 27a, each of these valves 26 and 27 comprises a reciprocably mounted plunger 28 that is actuated by a temperature-responsive element 29 to move into engagement with a valve seat 30 when the temperature-responsive element 29 is subjected to a predetermined temperature. Coiled compression springs 31 bias the plungers 28 away from the valve seats 30 toward a seated position against their respective seat members 26a and 27a. To provide means for coolant to flow from chamber A into tank 8 when plungers 28 are raised, the seat members 26a and 27a have passages 26b and 27b respectively therethrough and the valve seats 30 are supported on a bar type grid 14 which in turn is fastened to the side walls of duct 23. Plungers 28 are provided with a longitudinal passage 28a through their central portions and these plungers 28 are reciprocably mounted in ports 32 in the wall of the tank 8. Therefore, when the plungers 28 are seated against their respective members 26a and 27a (as the plunger 28 on the left in FIG. 2 is shown) coolant will flow from conduit 10 though chamber A, the passages 26b and 27b in members 26a and 27a, the passages 28a in plungers 28, and the duct 23 into storage tank 8 with very little leakage occurring between the plungers 28 and the ports 32. On the other hand, when the plungers 28 are seated on seats 30 (as the plunger 28 on the right in FIG. 2 is shown) the main stream of coolant passes through the passages 26b and 27b into chamber B.

To clearly illustrate the different operating positions of the temperature-responsive valves 26 and 27 in FIG. 2, valves 26 and 27 are shown as they would be positioned if valve 26 had a lower opening temperature than valve 27. In actual practice it has been found desirable to have the temperature-responsive valves open at approximately the same temperature. While two temperature-responsive valves 26 and 27 are shown, it will be understood that either a single valve or more than two such valves could be utilized by simply providing more ports such as 19 and 20 in the wall 16 and more ports and valve seats such as 32 and 30 respectively. When more than one temperature-responsive valve is utilized, it is not essential that each of such valves open at the same temperature, because if the respective valves open at different temperatures, this type of operation simply extends the range in which the heat-generating source is operated, and in certain applications this type of operation may be desirable.

It will be understood that temperature-responsive valves 26 and 27 open as a function of the temperature of the coolant and remain opened an amount corresponding to the coolant temperature. Thus they may allow a mere trickle of coolant to flow from inlet chamber A into chamber B and through conduits 12 and 13 into the radiators 1 through 6 if some means were not provided to further regulate the flow of coolant. As pointed out above, such a small flow of coolant in the radiators is undesirable because in low ambient temperature conditions the coolant would freeze in and possibly damage the radiators. To insure that either a large stream of coolant will flow through the radiators or that absolutely no coolant will flow, pressure-responsive valves 33 and 34 are provided to control the flow of coolant from chamber B of the passageway in unit 11 to the conduits 12 and 13 leading to the radiators, groups 1, 2 and 3, 4, 5, 6 respectively. Each pressure-responsive valve 33 and 34 comprises a tubular shaft 35 to which is rigidly fastened two piston valves 36 and 37 and a piston 38 at longitudinally spaced points thereon. It is obvious that valves 36 and 37 and piston 38 may be formed integrally with shaft 35 and take a different form so long as their operative relationship conforms to that set forth below. Valve 33 is reciprocable to control the flow of coolant from chamber B to chamber C, and valve 34 controls the flow of coolant from chamber C to chamber D. Valve seat member 39 is mounted in port 21 to cooperate with piston valve 37 to block the flow of coolant through its port when the valve 33 is in its lowermost position. In order to guide the movement of valve 33 so piston valve 37 will seat squarely, cylinder 40 is loosely disposed around piston 38 to guide the upper ends of tubular shaft 35, and fins 41 are provided on piston valve 36 to guide the lower end of tubular shaft 35 through sleeve 42. The sleeve 42 is mounted within port 43 in the wall of tank 8. Valve 34 is similar to valve 33 except that its piston valve seats on the lip of port 22 since seat member corresponding to 39 is not provided.

Since the water pump is normally driven directly by the diesel engine, its speed and hence its output pressure will vary in accordance with the speed of the engine.

It is found that at idling speed the pressure in chamber B may be marginal to cause the opening of valve 33 to permit water to enter chamber C and conduit 12 and the associated radiators if port 43 is not closed prior to the opening of port 21. To overcome this, the valve seat 39 of valve 33 has an upwardly projecting flange which delays the opening of port 21 until port 43 is closed. Thus valve 33 does not repeatedly flutter under such conditions. A valve seat member corresponding to 39 is not required in connection with valve 34 since valve 34 will not be opened under engine idling conditions and hence the pressure which develops in chamber C is more than adequate to cause the opening of this valve even if the associated port 43 is slightly open after port 22 is open.

The pressure-responsive valves 33 and 34 are preferably two-position snap acting valves. The vales are preferably biased by gravity, but other suitable biasing means may be utilized so that piston valves 37 seat to close ports 21 and 22. The valves 33 and 34 are forced open when the pressure of coolant within the chambers B and C respectively reaches a predetermined value such that the pressure differential developed between the pressure on the lower surface of piston 38 and on the smaller upper surface of piston valve 37 is sufficient to overcome the gravity force biasing the valve in its closed or seated position. The diameter of piston 38 is a predetermined amount larger than the piston valve 37 to provide the desired cross-sectional area against which the coolant can exert an upward pressure to overcome the gravity force on valves 33 and 34. When the pressure of the coolant reaches this predetermined value, the tubular shaft 35 moves rapidly to its uppermost position and thus almost instantaneously allows a large stream of coolant to be introduced into the lower valve chamber from whence this coolant flows to the respective radiator group that is in communication with this chamber as well as into communication with the next pressure-responsive valve in the series.

It is desirable to allow valves 33 and 34 to slide relatively freely in the cylinders 40 and sleeves 42 because this makes it possible to manufacture the valves in large numbers without maintaining close manufacturing tolerances which increase the expense of the product. Furthermore, by utilizing a relatively loose fit between the moving parts of the pressure-responsive valves, the likelihood of these elements becoming frozen together by the collection of a film of coolant between these members when the coolant is prevented from flowing into contact with them is greatly reduced. By making pistons 38 smaller than cylinders 40, such a desirably free sliding fit is obtained between the members; however, when this is done, coolant leaks past piston 38, as indicated by the broken arrows on FIG. 2, when the pressure-responsive valves 33 and 34 are in their lowermost positions. Thus the provision of hollow tubular shafts for valves 33 and 34 is important since it will prevent the freezing of the valve assemblies by permitting an adequate leakage flow past piston 38 under all conditions of operation and directing the coolant which so leaks past the piston into the tank 8 in a unique and simple manner.

In addition to embodying features which prevent the pressure-responsive valves themselves from being frozen in position, the pressure-responsive valves 33 and 34 are further characterized by being operable to allow coolant to drain rapidly from other portions of the cooling system when coolant is temporarily prevented from flowing to these portions of the system. In particular, when pressure-responsive valves 33 and 34 move to seat piston valves 37 following an interval when these valves were open to allow coolant to flow to conduits 12 and 13, the piston valves 36 slide downwardly and open ports 43 so coolant is allowed to drain rapidly by gravity flow from chambers C and D and also from conduits 12 and 13. Also air is admitted into chambers C and D through ports 43 to vent the radiators to permit complete drainage. Further, if coolant leaks past piston valves 37 under any conditions ports 24 and 25 will prevent the coolant from trickling through the radiators. It will be understood that FIG. 1 is a schematic illustration of the relative positions of the components of our cooling system and in practice the radiators 1 through 6 will be disposed above the storage tank 8 so coolant will drain rapidly into tank 8 under the force of gravity when valves 33 and 34 are moved to their lowermost positions.

For purposes of illustration valve 33 is shown (in FIG. 2) in its open or raised position and valve 34 in its seated or lowermost position. It will be understood that valves 33 and 34 will be closed until the pressure of coolant in chambers B and C respectively attains a predetermined pressure sufficient to effect opening thereof. It will be further understood that valves 33 and 34 need not be designed to open at the same pressure, but may be designed to have different operating pressures by simply varying the effective areas on pistons 37 and 38 against which the coolant exerts an upward pressure. For example, the valve 33 may be designed to open at a lower pressure and close at a higher pressure than the valve 34.

In the structure shown in FIG. 2 wherein valves 33 and 34 have the same size pistons 37 and piston valves 38, the valves will open at different times, that is sequentially, depending on how long it takes the pressure in chamber C to build up to a level sufficient to open valve 34. It will be seen, however, that valves 33 and 34 will close simultaneously because the pressure of coolant in chamber B will equal the pressure of coolant in chamber C when both valves 33 and 34 are open. Due to the fact that valves 33 and 34 are designed to close at a considerably lower pressure than that at which they open, there is little likelihood that the pressure in chamber B will be sufficient to cause valve 33 to be immediately reopened. However, if such cycling should occur, it may be eliminated by either increasing the differential between the opening and closing pressures of both valves 33 and 34, or by making the operating pressures of valves 33 and 34 different so valve 34 will close before valve 33 is closed. The latter expedient is practical only where the disadvantage of valve 33 cycling occasionally is deemed to outweigh the disadvantage of having more than one standard size of pressure-responsive valves in the system.

In operation, the automatically controlled radiator cooling system functions as follows: Assuming a heat-generating source has been connected to conduits 10 and 15 and has just been energized, and assuming that the ambient temperature is fairly low, coolant will be withdrawn from storage tank 8 through conduit 15 by a coolant circulating means such as a water pump (not shown) and circulated in heat exchange relation with the heat-generating source from whence it will be returned through conduit 10 to control unit 11. Since the heat-generating source has just started operation, the coolant will not be sufficiently heated to cause temperature-responsive valves 26 and 27 to open; therefore, the coolant will flow through the passages 28a in plungers 28 and be returned through ports 32 and duct 23 directly to the storage tank 8 without passing through any of the radiators 1 through 6.

Now, as the heat-generating source continues to operate, the coolant entering unit 11 through conduit 10 becomes sufficiently heated to cause the valves 26 and 27 to start opening slowly and a small trickle of coolant flows into the inlet chamber B and thus into contact with pressure-responsive valve 33. Of course, some of the coolant continues to flow through the passages 28a in the plungers 28 of valves 26 and 27 and thus is returned directly to the storage tank 8 until these valves open sufficiently to seat the plungers 28 on the seats 30. As the plungers 28 continue to move away from the ports 19 and 20, the pressure of the coolant within the chamber B continues to increase gradually until this pressure reaches a predetermined value such that the pressure differential between the large lower surface of piston 38 and the somewhat smaller upper surface of piston valve 37 is sufficiently great to overcome the force of gravity which biases valve 33 to its closed position. It will be understood that during this interval no coolant is allowed to flow into any of the radiators 1 through 6. When the predetermined pressure value is reached, valve 33 moves very rapidly to its uppermost position and a large stream of coolant is introduced through port 21 into the chamber C and thence through conduit 12 into radiators 1 and 2 from whence it drains by gravity flow through conduits 7 and 9 respectively back into the storage tank 8.

Coolant is also allowed to flow into contact with pressure-responsive valve 34 when valve 33 opens, but valve 34 will not be moved immediately to its open position, because the flow of coolant passing through radiators 1 and 2 will be sufficient to reduce the pressure in the chamber C to a value lower than the pressure that existed in the chamber B when the pressure-responsive valve 33 first opened. However, as the temperature of the coolant continues to rise, the valves 26 and 27 will be opened still further and thus increase the pressure of the coolant in contact with the pressure-responsive valve 34 to a value such that this valve will also be opened and thus allow coolant to flow into the chamber D. The coolant then flows through conduit 13 to radiators 3, 4, 5, and 6 and thence through conduits 7 and 9 back to storage tank 8.

The system is now operating at its maximum cooling capacity, and may reduce the temperature of the coolant and the heat-generating source within a very short time to a temperature value such that the coolant returning from the heat-generating source through conduit 10 will be so cool that valves 26 and 27 will start to close and thus reduce the pressure of coolant that comes in contact with the pressure-responsive valves 33 and 34. When this pressure is reduced to a predetermined value somewhat below the predetermined value at which the pressure-responsive valves open, valves 33 and 34 will be returned to their seated positions simultaneously by the biasing force of gravity. When valves 33 and 34 move to their seated positions, radiators 1, 2 and 3, 4, 5, and 6 are rapidly drained by gravity flow through conduits 7 and 9 into storage tank 8 due to the arrangement of these radiators with respect to the storage tank 8. Also, the conduits 12 and 13 are drained through the ports 43 in the wall of the tank 8. If the temperature of the coolant again rises, valve 33 will again be moved to its open position as described above and the cycle will be repeated.

While a particular embodiment of our automatically controlled radiator-type cooling system has been shown and described, it will be obvious to those skilled in the art that various modifications may be made without departing from the invention in its broader aspects. Therefore, it is intended in the following claims to encompass all such modifications as fall within the true scope of the invention.

What we claim as new and desire to secure by Letters Patent of the United States is:

1. A cooling system comprising a radiator, means defining a passageway for introducing a coolant to said radiator, a first valve disposed in said passageway and responsive to the temperature of the coolant for controlling the introduction of the coolant to the radiator, a second valve disposed in said passageway between said first valve and said radiator and responsive to the pressure of the coolant in the passageway between said first valve and said second valve for further controlling the introduction of coolant to said radiator, said first valve being effective to prevent the introduction of coolant to the radiator when the temperature of the coolant is below a predetermined value, and said second valve being effective to prevent the introduction of coolant to the radiator until the pressure of the coolant in the passageway between the first and second valve reaches a predetermined value effective to cause said second valve to open, whereby coolant is introduced to said radiator only in a large and adequately heated quantity to prevent coolant from freezing in said radiator.

2. A cooling system as defined in claim 1 wherein said second valve is disposed in said passageway between the temperature-responsive valve and the radiator, whereby said second valve is in direct contact with the coolant circulating through the passageway.

3. A cooling system comprising in combination a heat-generating source, a radiator, a fluid coolant storage tank; conduit means for circulating a coolant under pressure in a closed circuit through said heat-generating means, said radiator, and said storage tank; temperature-responsive valve means disposed in the conduit means to regulate the flow of coolant from the heat-generating means to the radiator; pressure-responsive valve means disposed in the conduit means between the temperature-responsive valve means and the radiator for blocking the flow of coolant to said radiator until the pressure of the coolant attains a predetermined value; second conduit means controlled by the temperature-responsive valve means for by-passing coolant around the pressure-responsive valve means to the storage tank; said temperature-responsive valve means being effective to prevent coolant from being introduced to the radiator when said coolant is below a predetermined temperature value; said pressure-responsive valve means being effective to block the flow of coolant to said radiator when the pressure of coolant in the conduit means between the temperature-responsive valve means and the pressure-responsive valve means is below a predetermined value whereby coolant is introduced to said radiator only in a large and adequately heated quantity to prevent coolant from freezing in said radiator.

4. A cooling system as defined in claim 3 wherein the temperature-responsive valve means comprises a plurality of individual temperature-responsive valves disposed in parallel in the conduit means and each of said valves is adjusted to open at a different temperature value.

5. A cooling system as defined in claim 3 wherein the temperature-responsive valve means comprises a plurality of individual temperature-responsive valves disposed in parallel in the conduit means and each of said valves is adjusted to open at the same temperature value.

6. A cooling system as defined in claim 3 wherein the pressure-responsive valve means includes means for by-passing leakage coolant around said pressure-responsive valve means to the coolant storage tank and further includes means for controlling said bypassing means.

7. A cooling system comprising first and second radiators, a fluid coolant storage tank, means defining a first passageway for introducing a coolant to said radiators, a valve disposed in said passageway and responsive to the temperature of the coolant for controlling the introduction of the coolant to the radiators, a first valve disposed in said first passageway between said temperature-responsive valve and said radiators and responsive to the pressure of the coolant in said first passageway between the temperature-responsive valve and said first pressure-responsive valve for further controlling the introduction of coolant to said first radiator, means defining a second passageway between said first valve and said second radiator, a second valve disposed in said second passageway between said first valve and said second radiator and responsive to the pressure of the coolant between said first and second pressure-responsive valves for further controlling the introduction of coolant to said second radiator, said temperature-responsive valve being effective to prevent the introduction of coolant to the radiators when the temperature of said coolant is below a predetermined value, said first pressure-responsive valve being effective to prevent the introduction of coolant to said radiators when the pressure of said coolant in said first passageway between the temperature-responsive valve and the first pressure-responsive valve is below a predetermined value, whereby coolant is introduced to said first radiator only in a large and adequately heated quantity to prevent coolant from freezing in said first radiator, said second pressure-responsive valve being effective to prevent the introduction of coolant to the second radiator when the pressure of the coolant in the passageway between said first and second pressure-responsive valves is below a predetermined value, whereby coolant is introduced to said second radiator only in a large and adequately heated quantity to prevent coolant from freezing in said second radiator.

8. A cooling system as defined in claim 7 wherein coolant bypassing conduit means are provided for by-passing leakage coolant around said radiators when said valves are in such a position that they prevent the flow of coolant to the radiators, said bypass means being effective to introduce the leakage coolant thus bypassed directly to the storage tank.

9. A cooling system as defined in claim 7 wherein each of said radiators is so arranged above the storage tank that all coolant drains rapidly from the radiators by gravity flow, whereby coolant is prevented from freezing in either of said radiators when the flow of coolant to said radiators is temporarily blocked.

10. A cooling system as defined in claim 7 wherein both pressure-responsive valves are designed to close simultaneously when the coolant pressure is reduced to a predetermined value.

11. A cooling system as defined in claim 7 wherein the first pressure-responsive valve is designed to open at a lower pressure and close at a higher pressure than said second valve.

12. A cooling system comprising a heat exchanger, means defining a passageway for introducing a coolant to said heat exchanger, a first valve disposed in said passageway and responsive to the temperature of the coolant for controlling the introduction of said coolant to the heat exchanger, a second valve disposed in said passageway between said first valve and said heat exchanger responsive to the pressure of the coolant in the passageway between said first valve and the heat exchanger for further controlling the introduction of coolant to said heat exchanger, said first valve being effective to prevent the introduction of coolant to the heat exchanger when the temperature of said coolant is below a predetermined value, said second valve being effective to prevent the introduction of coolant to the heat exchanger until the pressure of said coolant in the passageway between the first and second valves reaches a predetermined value effective to cause said second valve to open and introduce coolant into the heat exchanger whereby coolant is introduced to said heat exchanger only in a large and adequately heated quantity to prevent coolant from freezing in said heat exchanger.

13. A cooling system for removing heat generated in a heat-generating means comprising a heat exchanger, a fluid coolant reservoir, means defining a first passageway for introducing a coolant to the heat-generating means from said reservoir, means defining a second passageway for transmitting coolant from the heat-generating means to said heat exchanger, a temperature-responsive valve means disposed in said second passageway and responsive to the temperature of the coolant for controlling the introduction of the coolant to the heat exchanger, said temperature-responsive valve means being effective to return to said reservoir coolant not introduced into said second passageway, valve means responsive to the pressure of the coolant in said second passageway between the temperature-responsive valve means and the heat exchanger for further controlling introduction of the coolant to said heat exchanger, said temperature-responsive means being effective to prevent the introduction of coolant to the heat exchanger when the temperature of the coolant is below a predetermined value, said pressure-responsive valve means being effective to prevent the introduction of coolant to the heat exchanger until the pressure of the coolant in said second passageway between said temperature-responsive valve means and said pressure-responsive means reaches a predetermined value effective to cause said second valve to open and introduce coolant into the heat exchanger.

14. The system of claim 13 wherein said pressure-responsive valve comprises a piston which is adapted to be moved to an open position by the coolant when the coolant in said second passageway exerts a predetermined pressure on said piston.

15. The system of claim 14 wherein said piston is moved to a closed position by the force of gravity when the pressure of the coolant in said second passageway falls below a predetermined value insufficient to hold said piston in an open position.

16. In a system for cooling a heat-generating source of the type comprising a heat exchanger; a coolant storage tank; conduit means for conveying coolant from said storage tank to said heat-generating means, from said heat-generating means to said heat exchanger, and from said heat exchanger to said storage tank; means for causing circulation of coolant through said conduit means; and flow control means for controlling the flow of coolant from said heat-generating means to said heat exchanger and by-passing coolant from said heat exchanger to said storage tank dependent on the temperature of the coolant emerging from said heat-generating means; an improved flow control means comprising, means defining a first passageway for conducting coolant from said heat-generating means to said storage tank; means defining a second passageway for conducting coolant from said heat-generating means to said heat exchanger, first valve means responsive to the temperature of the coolant emerging from said engine in said first passageway for restricting flow of coolant into said storage tank with increasing coolant temperature and directing coolant into said second passageway; second valve means in said second passageway normally held closed by gravity and blocking coolant from said heat exchanger, said second valve means being effective in response to a predetermined pressure of coolant in said second chamber to open and allow communication between said second passageway and said heat exchanger and effective to close when the pressure of the coolant in said second passageway is insufficient to hold said valve open against the force of gravity.

References Cited in the file of this patent

UNITED STATES PATENTS

| | | |
|---|---|---|
| 1,851,765 | Henshall | Mar. 29, 1932 |
| 2,498,637 | Bay | Feb. 28, 1950 |
| 2,517,812 | Wade | Aug. 8, 1950 |

OTHER REFERENCES

Publication by Fulton Sylphon Co.—"How To Install Sylphon Pressure Regulators," page 225–10, copyright 1930.